US010549285B2

(12) United States Patent
Palese et al.

(10) Patent No.: US 10,549,285 B2
(45) Date of Patent: Feb. 4, 2020

(54) GRINDER AUGER REMOVAL TOOL

(71) Applicant: Blue Sky Innovation Group, Inc., Avon, OH (US)

(72) Inventors: Jeffrey W. Palese, North Ridgeville, OH (US); Joseph J. Smith, North Ridgeville, OH (US)

(73) Assignee: BLUE SKY INNOVATION GROUP, INC., Avon, OH (US)

( * ) Notice: Subject to any disclaimer, the term of this patent is extended or adjusted under 35 U.S.C. 154(b) by 657 days.

(21) Appl. No.: 15/143,656

(22) Filed: May 2, 2016

(65) Prior Publication Data

US 2016/0318032 A1 Nov. 3, 2016

Related U.S. Application Data

(60) Provisional application No. 62/155,503, filed on May 1, 2015.

(51) Int. Cl.
*B23P 6/00* (2006.01)
*B02C 18/30* (2006.01)

(52) U.S. Cl.
CPC ............ *B02C 18/305* (2013.01); *B02C 18/30* (2013.01); *B02C 18/302* (2013.01); *B02C 18/304* (2013.01)

(58) Field of Classification Search
CPC .................................. B25B 27/04; B23P 6/00
See application file for complete search history.

(56) References Cited

U.S. PATENT DOCUMENTS

| | | | | |
|---|---|---|---|---|
| 898,568 A * | 9/1908 | Emmerson | B44D 3/162 | 254/25 |
| 1,255,660 A * | 2/1918 | Stevens | B25C 11/00 | 254/25 |
| 1,550,894 A * | 8/1925 | Knuth | B25F 1/006 | 254/21 |
| 3,134,574 A * | 5/1964 | Reuterfors | E04G 23/08 | 254/131 |
| 3,211,240 A * | 10/1965 | Smitter | E04G 19/00 | 173/132 |
| 3,791,597 A * | 2/1974 | Walter | A47J 43/042 | 241/100 |
| 5,695,172 A * | 12/1997 | Hreha | B25C 11/00 | 254/18 |
| 5,884,900 A * | 3/1999 | Gobeil | B25C 11/00 | 254/21 |
| 2017/0274385 A1* | 9/2017 | Moore | B02C 18/305 | |

* cited by examiner

*Primary Examiner* — Adam J Eiseman
*Assistant Examiner* — Bobby Yeonjin Kim
(74) *Attorney, Agent, or Firm* — Tarolli, Sundheim, Covell & Tummino LLP

(57) ABSTRACT

An apparatus for removing an auger from a grinder head includes a tool member including an auger engaging portion for receiving a front shaft portion of the auger. The auger engaging portion is adapted to be received in a tool engaging portion of the front shaft to for an interference that permits a removal force applied to the tool member to be transferred to the auger.

4 Claims, 9 Drawing Sheets

GRINDER AUGER REMOVAL TOOL

RELATED APPLICATIONS

This application claims the benefit of U.S. Provisional Application No. 62/155,503, which was filed on May 1, 2015, the subject matter of which is hereby incorporated by reference in its entirety.

TECHNICAL FIELD

This invention relates to a food processing apparatus. More specifically, this invention relates to a tool for removing an auger from a grinder head.

BACKGROUND OF THE INVENTION

Grinders are food processing appliances that are used to grind, chop or mince food products, such as meat, fish, poultry, vegetables, or similar foods. The most common food products processed in a grinder are meat products, such as beef, pork, venison, etc. Grinders include a grinder head unit that is attached to a power source, typically an electric motor or hand crank, that is operable to rotate a shaft. Rotation of the shaft imparts rotation to an auger that forces the food product past a rotating knife and through a metal plate, which mince the food product. After use, the components of the grinder head must be removed for cleaning. It is often the case, however, that the auger is difficult to remove because residual food product, such as minced meat, forms a seal between itself and other grinder head components, such as the housing, which results in a vacuum that inhibits its removal.

SUMMARY OF THE INVENTION

According to one aspect, an apparatus for removing an auger from a grinder head includes a tool member including an auger engaging portion for receiving a front shaft portion of the auger. The auger engaging portion is adapted to be received, in a tool engaging portion of the front shaft to form an interference that permits a removal force applied, to the tool member to be transferred to the auger.

According to another aspect, the tool member can include a plate having a auger receiving aperture. The aperture can define an auger engaging portion of the plate along at least a portion of the periphery of the aperture. A handle can be connected to the plate, the handle being for manually manipulating the tool member.

According to another aspect, the auger receiving aperture can have an elongated tapered configuration and include a large dimension first end portion, a small dimension second end portion, and opposing edges that extend from the first end portion to the second end portion. The sidewalls can have a tapered configuration in which the sidewalls converge as they extend from the first end portion to the second end portion. The large dimension can be sufficient to permit the front shaft to pass freely through the auger receiving aperture, and the small dimension can be configured such that the auger engaging portion forms the interference. The first and second end portions can have rounded configurations, and the sidewalls can extend tangentially from the first end portion to the second end portion.

According to another aspect, the tool engaging portion can include an annular recess in the front shaft, the auger engaging portion of the tool member being received in the recess to help form the interference.

According to another aspect, the grinder head can include a housing that supports the auger for rotation about an axis. The grinder head can also include as knife that is attached to the front shaft of the auger and rotatable with the auger about the axis. The grinder head can also include a die adjacent the knife. The die can include a portion through which the front shaft extends. The die can also support the auger for rotation about the axis. The grinder head can also include a collar connectable to the housing to retain the auger, knife, and die in the housing.

According to another aspect, a meat grinder system can include a grinder head comprising a housing and an auger disposed in the housing for rotation about an axis. The auger can include a shaft including a tool engaging portion. The system can also include a tool for facilitating removal of the auger from the housing. The tool can include an auger engaging portion adapted to be received in a tool engaging portion of the front shaft to form an in that permits a removal force applied to the tool member to be transferred to the auger.

According to another aspect, the tool can include a plate having a auger receiving aperture. The aperture can define an auger engaging portion of the plate along at least a portion of the periphery of the aperture. The tool can also include a handle connected to the plate, the handle being for manually manipulating the tool member.

According to another aspect, the auger receiving aperture can have an elongated tapered configuration and includes a large dimension first end portion, a small dimension second end portion, and opposing edges that extend from the first end portion to the second end portion. The sidewalls can have a tapered configuration in which the sidewalls converge as they extend from the first end portion to the second end portion. The large dimension can be sufficient to permit the front shaft to pass freely through the auger receiving aperture, and the small dimension can be configured such that the auger engaging portion forms the interference. The first and second end portions can have rounded configurations, and the sidewalls can extend tangentially from the first end portion to the second end portion.

According to another aspect, the tool engaging portion can include an annular recess in the front shaft. The auger engaging portion of the tool member can be received in the recess to help form the interference.

BRIEF DESCRIPTION OF THE DRAWINGS

For a better understanding of the invention, reference may be made to the accompanying drawings.

DESCRIPTION OF EMBODIMENTS

Figure 1:
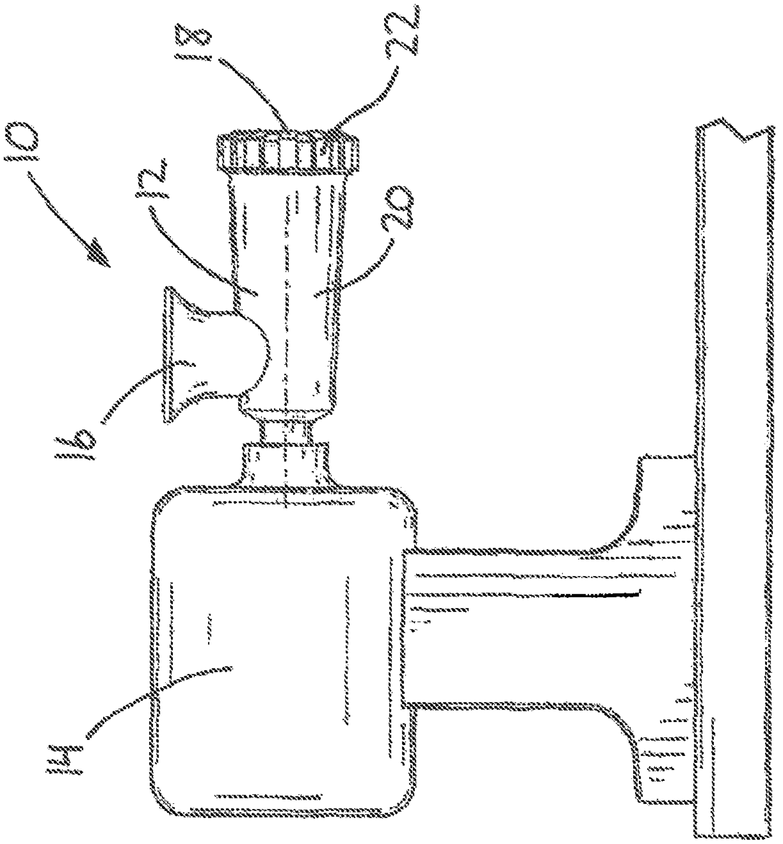
FIG. 1 is a side elevation view illustrating a grinder including a grinder head.
Figure 2:
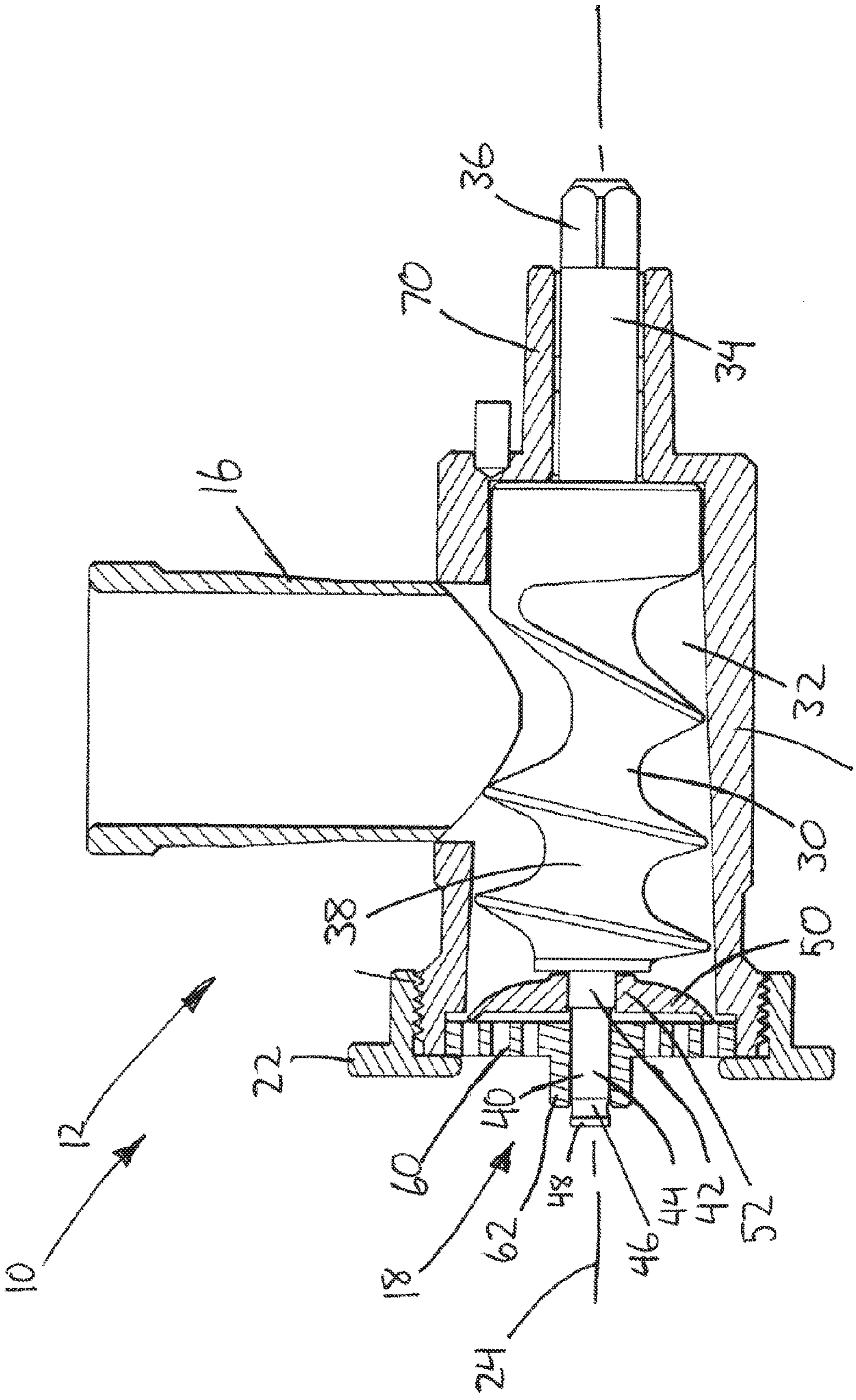
FIG. 2 is a sectional view of the grinder head.
Figure 3:
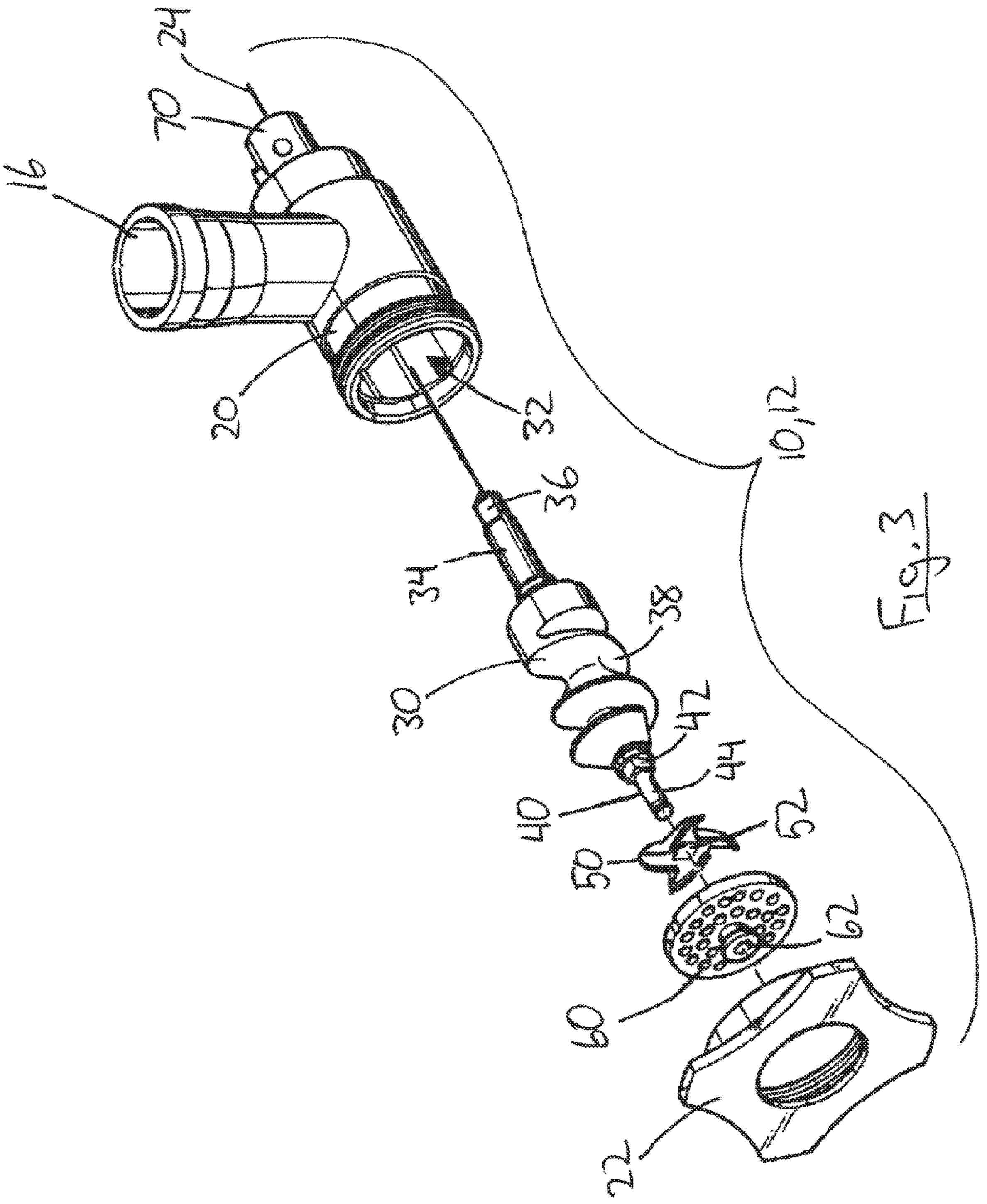
FIG. 3 is an exploded view of the grinder head.

A known food processing apparatus 10 in the form of a meat grinder is illustrated in FIG. 1-3. The meat grinder 10 includes a grinder head 12 and a power source 14, such as an electric motor. The electric motor power source could be replaced with a hand crank. The grinder head 12 includes an inlet or chute 16, into which raw meat is fed, and an outlet 18 from which the ground or minced meat is discharged. The grinder head 12 includes a housing 20 that houses typical grinder components, such as an auger/screw conveyor, a rotating knife including mincing blades, and a fixed hole plate or die. These typical components are shown, for example, in U.S. Pat. No. 7,207,510 B2, issued Apr. 24, 2007, the disclosure of which is hereby incorporated by reference in its entirety. A collar 22 attaches to the housing 20 to contain the grinder components therein. The collar 22 is removable from the housing for cleaning and for replacing/swapping components.

FIGS. 2 and 3 illustrate the grinder head 12 in greater detail. The configuration of the grinder head 12 illustrated in FIGS. 2 and 3 is but one example grinder head configuration. Those skilled in the art will appreciate that the configuration of the grinder head 12 could differ from that illustrated in FIGS. 2 and 3 without materially affecting or otherwise departing from the spirit and scope of the invention disclosed herein.

Referring to FIGS. 2 and 3, the grinder head 12 includes an auger 30 disposed in an auger chamber 32 of the housing 20 for rotation about an axis 24. The grinder head 12 also includes a knife 50 and a fixed hole plate or die 60. The auger 30 includes a drive shaft 34 that extends from a rear end of a screw conveyor portion 38 of the auger. The drive shaft 34 the auger through and protrudes from a neck portion 70 of the housing 20. The neck portion 70 interfaces with the power source 14 (see FIG. 1) to help connect the grinder head 12 to the power source. The drive shaft 34 includes a drive adaptor 36 that is configured to be received in a socket (not shown) of the power source 14 when the grinder head 12 is connected to the power source. Through this connection, rotational energy supplied by the power source can be transferred to the grinder head 12, particularly the auger 30.

The auger 30 also includes a front shaft 40 that extends from a front end of the screw conveyor portion 38 of the auger. The front shaft 40 includes a knife drive portion 42 that extends through the knife 50 and engages a knife hub 52 for example, via teeth or a keyway, so that the knife rotates with the auger 30. The front shaft 40 also includes a hearing portion 44 that extends through a hub 62 of the fixed hole plate 60. The hearing portion 44 of the front shaft 40 is rotatable in the die hub 62 so that the bearing portion and the die hub act as a bearing for supporting the auger 30 for rotation in the housing 20.

With the components of the grinder head 12 assembled as shown in FIG. 2, the collar 22 is screwed onto the housing 20 to complete the assembly. The collar exerts a clamping force on the components, urging the fixed hole plate 60 against the knife, which urges the auger 30 into the housing 20. The connection of the collar 22 to the housing 20 seats the auger 30 in the auger chamber 32. The configuration of these parts is selected such that the power source 14 is operable to impart rotation to the auger 30 and knife 50 while the die 60 remains stationary, supporting the front shaft 40.

In operation, whole or cubed raw meat is fed into the inlet 16 on top of the grinder head 12, and the meat is propelled horizontally on the rotating screw conveyor portion 38 of the auger 30. The screw conveyor portion can also squash and partially mix the meat as it is propelled. At the end of the screw conveyor portion 38, the knife 50 is positioned in front of and adjacent to the fixed hole plate 60. The auger 30 forces the meat past the knife 50 and through the holes in the plate 60. The blades of the rotating knife 50 mince or grind the meat, which is discharged through the holes in the plate 60 and through the outlet 18, size of the holes in the plate determines the fineness of the ground meat.

According to a first embodiment of the invention, the grinder head 12 includes an auger removal feature that facilitates removal of the auger 30 from the housing 20 using a specialized tool. As best shown in FIG. 2, the front shaft 40 includes an tool engaging portion 46 which, in the illustrated embodiment, is in the form of an annular recess or groove.

Figure 4:
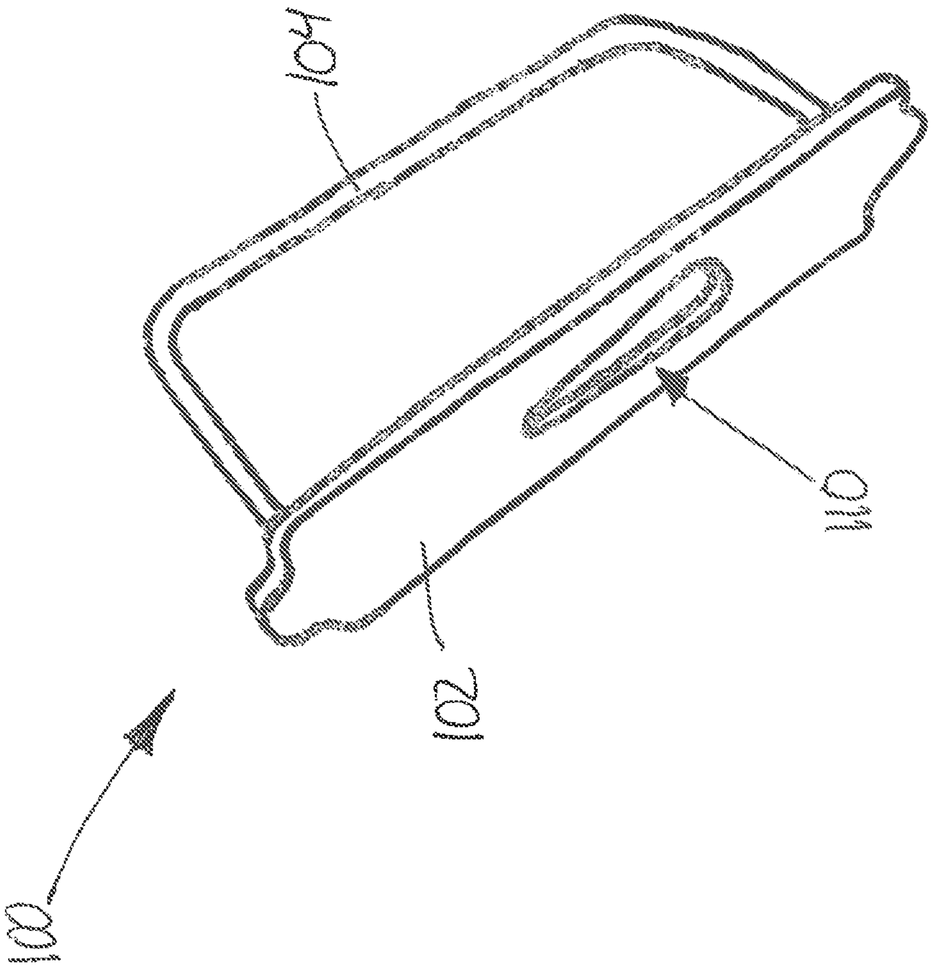
FIG. 4 is a perspective view of an apparatus for removing an auger from the grinder head, according to one embodiment of the invention.
Figure 5:
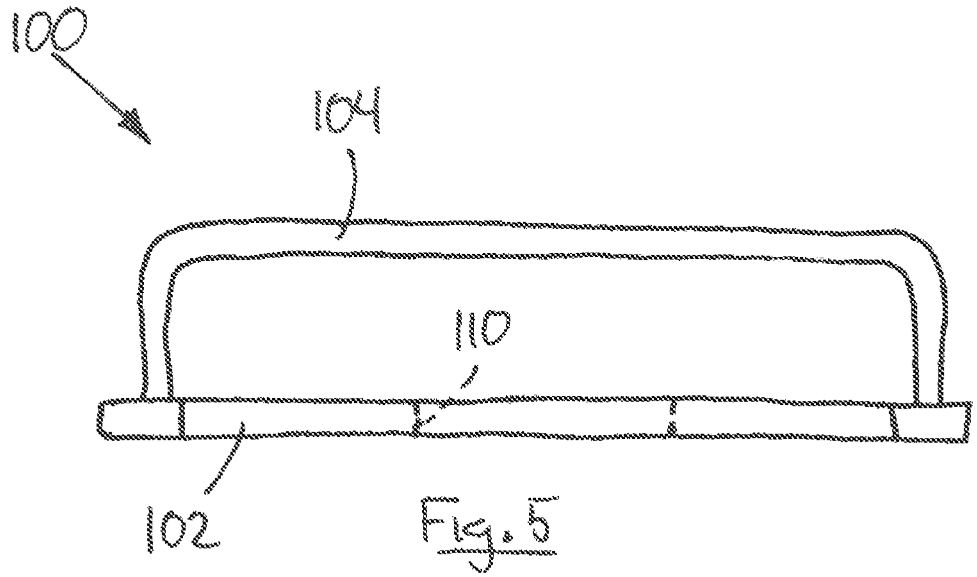
FIG. 5 is a side elevation view of the apparatus of FIG. 4
Figure 6:
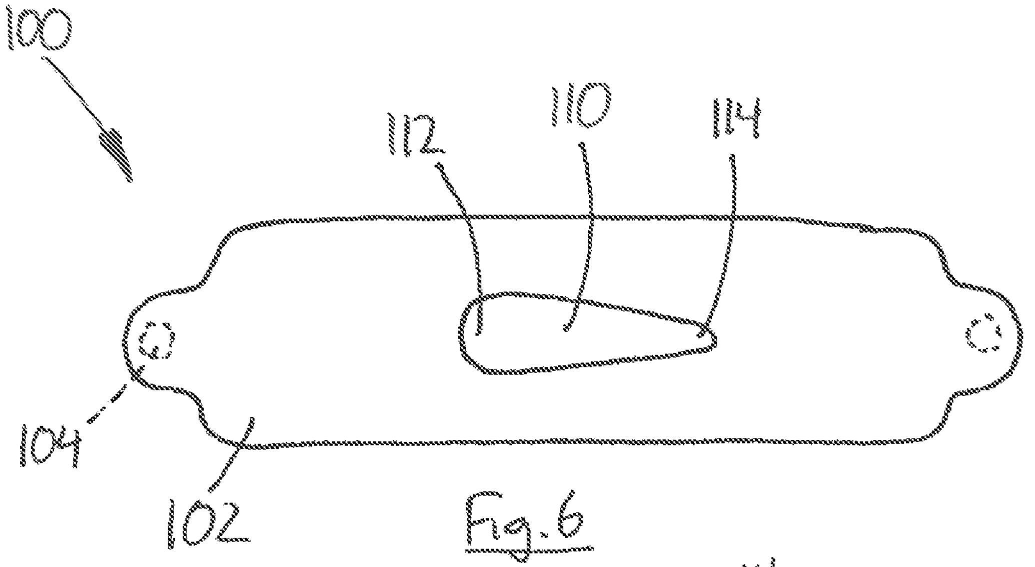
FIG. 6 is a bottom view of the apparatus of FIG. 4

Referring to FIGS. 4-6, according to the invention, an auger removal tool 100 includes a tool member 102 in the form of a plate and a handle 104 for grasping and manipulating the tool. The plate 102 has a flat, generally elongated and rectangular configuration. The handle 104 has a generally C-shaped configuration with opposite ends connected to the plate 102. The shape and configuration of the auger removal tool 100 can deter from that illustrated in FIGS. 4-6, as long as the configuration is conducive to operation of the tool as described herein.

The auger removal tool 100 can be constructed of a variety of materials, such as plastic, metal, or a combination of these materials. In one particular construction, the auger removal tool 100 is constructed of steel, such as stainless steel.

The auger removal tool 100 includes an auger engaging component or portion 110 in the form of a shaft engaging aperture that extends through the plate 102. The shaft engaging aperture 110 has a generally elongated, tapered configuration, with a large dimension first end 112, a small dimension second end 114, and edges or sidewalls 110 that taper between the first and second ends. In the illustrated embodiment, the ends are rounded and, thus, the first end 112 has a large diameter end 112, and the second end 114 has a small diameter. The edges 110 are straight or linear and extend between the ends 112, 114, tangential to the rounded portions of each end.

The auger removal tool 100 is configured to engage and form an interference with the tool engaging portion 40 of the front shaft 40 to allow the user to exert a removal force in the direction of the axis 24 in order to remove the auger 30 form the housing 20. To facilitate this, the diameter of the large diameter end 112 of the shaft engaging aperture 110 is greater than the outside diameter of the front shaft 40, and the diameter of the small diameter end 114 of the aperture is equal to or less than the inside diameter of the recess forming the tool engaging portion 40 of the front shaft 40.

Figure 7:
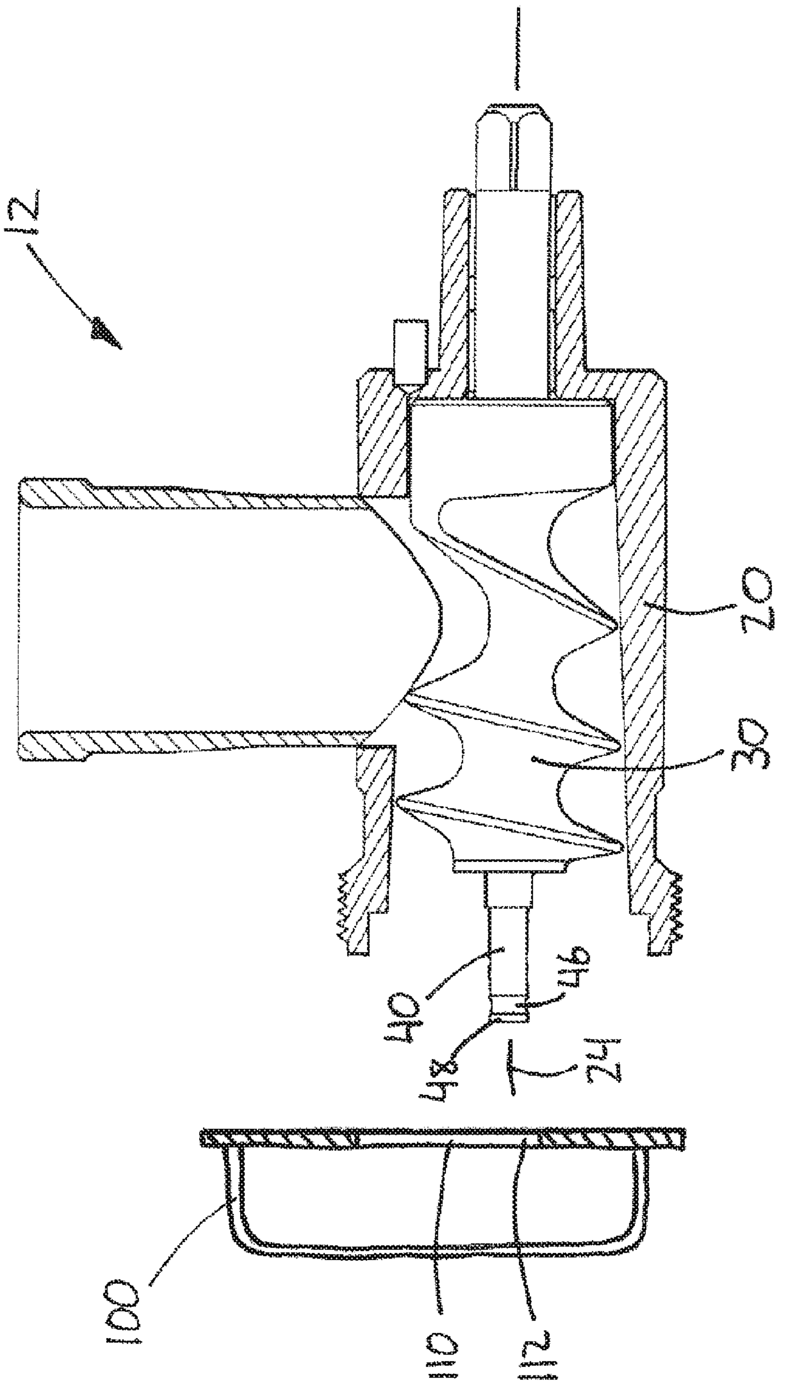
Figure 8:
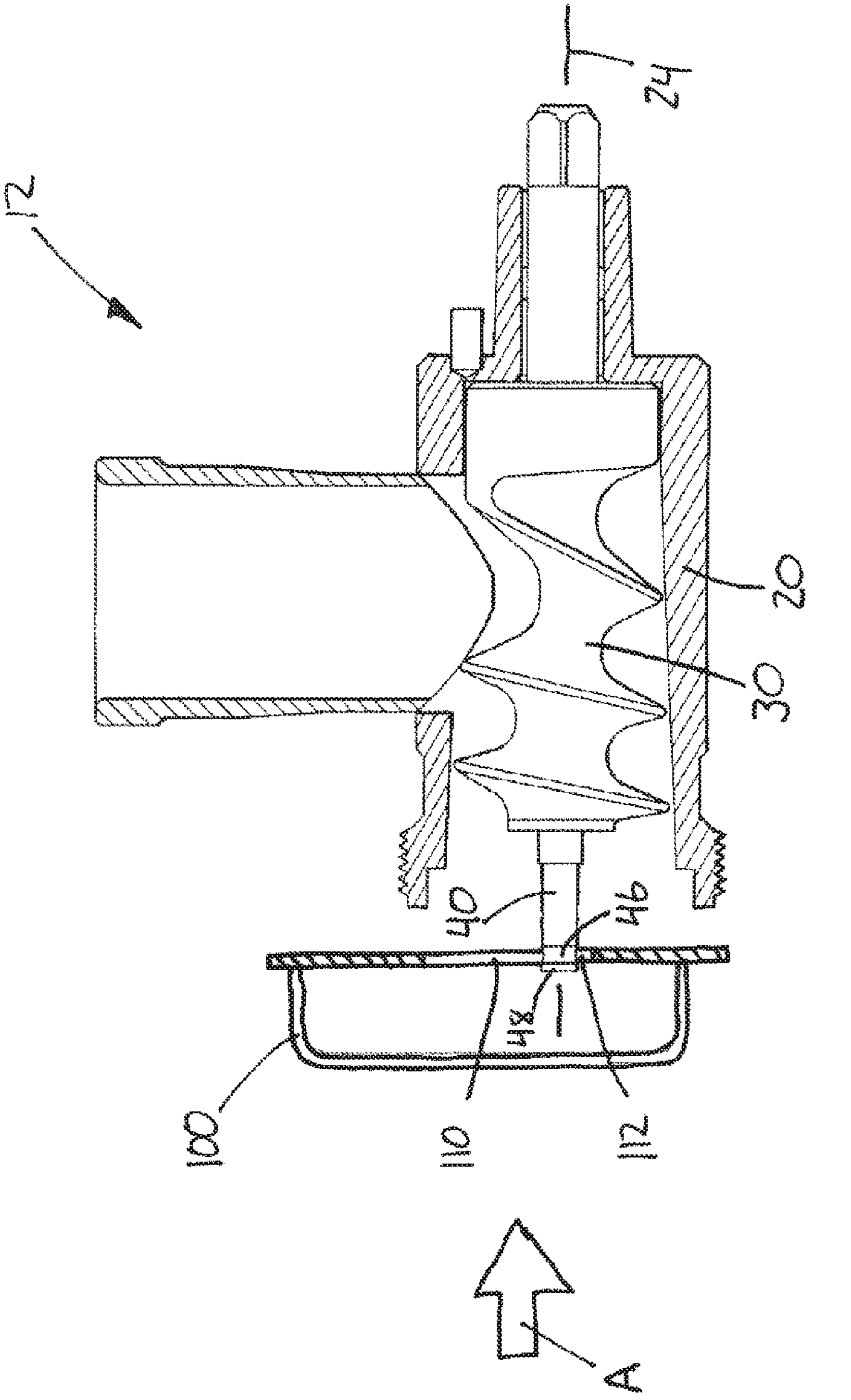

Use of the auger removal tool 100 to remove the auger 30 from the housing 20 of the grinder head 12 is illustrated in FIGS. 7-10. Referring to FIG. 7, the auger removal tool 100 is positioned so that the large diameter end 112 of the aperture 110 is aligned with the front shaft 40 of the auger 30. Next, referring to FIG. 8, the tool 100 is moved, in the direction of arrow A so that the front shaft 40 enters the aperture 100 and positions the tool engaging portion 46 of the front shaft in the large diameter end 112 of the aperture.

Figure 9A:
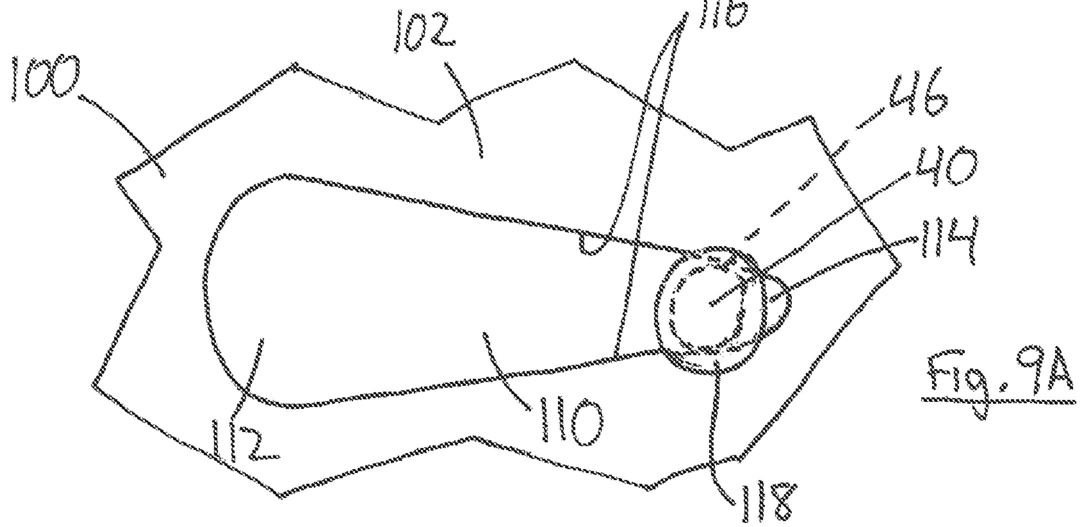
FIGS. 7-10 are side views, partially in section, that illustrate the operation of the apparatus of FIGS. 4-6 in conjunction with the grinder head of FIGS. 1-3.
Figure 9:
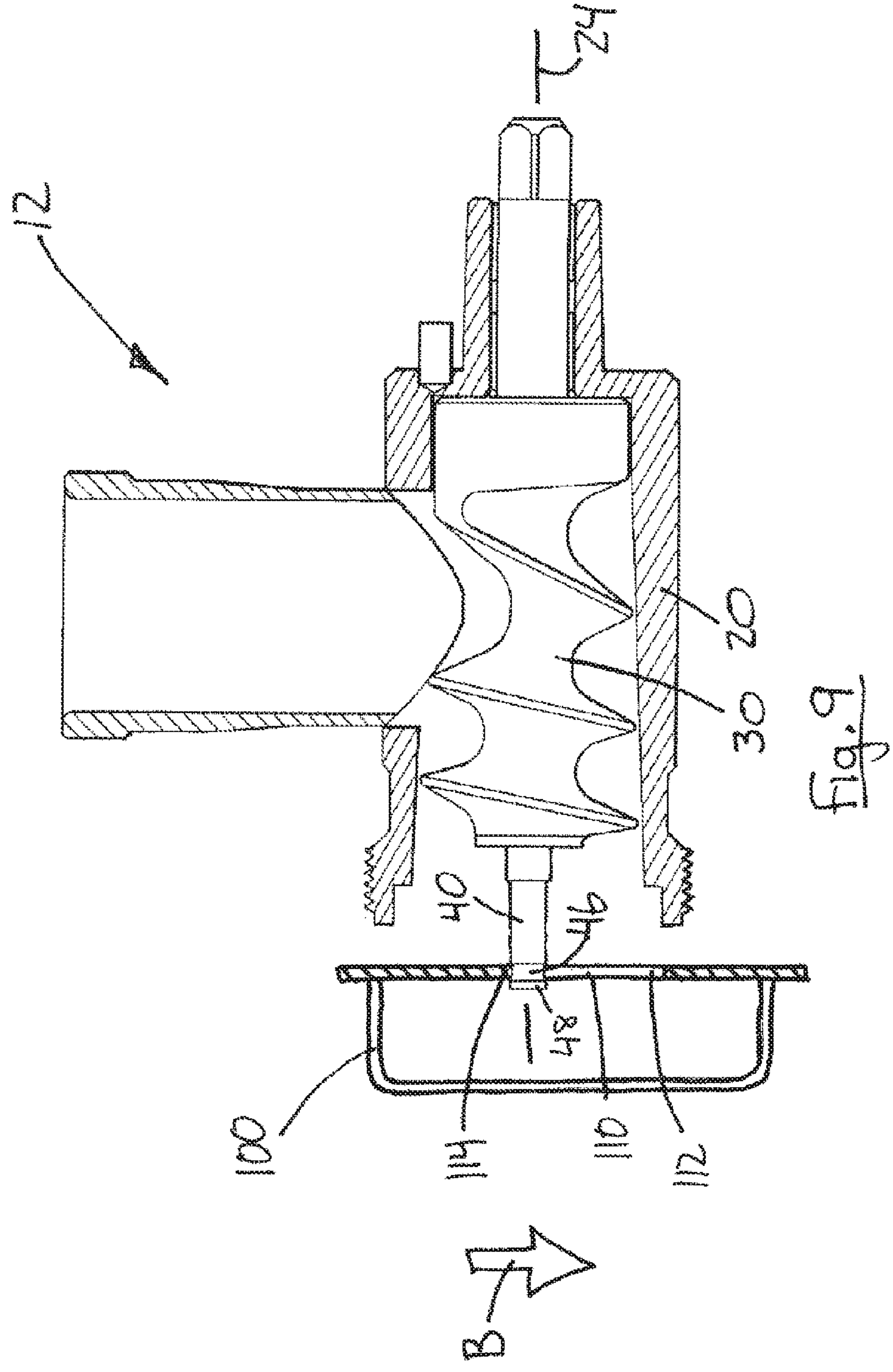

Next, referring to FIG. 9, the auger removal tool 100 is moved downward relative to the grinder head 12 in the direction of arrow B to position the tool engaging portion 48 of the front shaft 40 in the small diameter end 114 of the shaft engaging aperture 110. Referring to FIG. 9A, in this position, converging edges 116 of the shaft engaging aperture 100 enter and engage the tool engaging portion 46 of the front shaft 40. This forms an interference between portions of the plate 102 adjacent the aperture 100 and the terminal end portion 118 of the front shaft 40.

Figure 10:
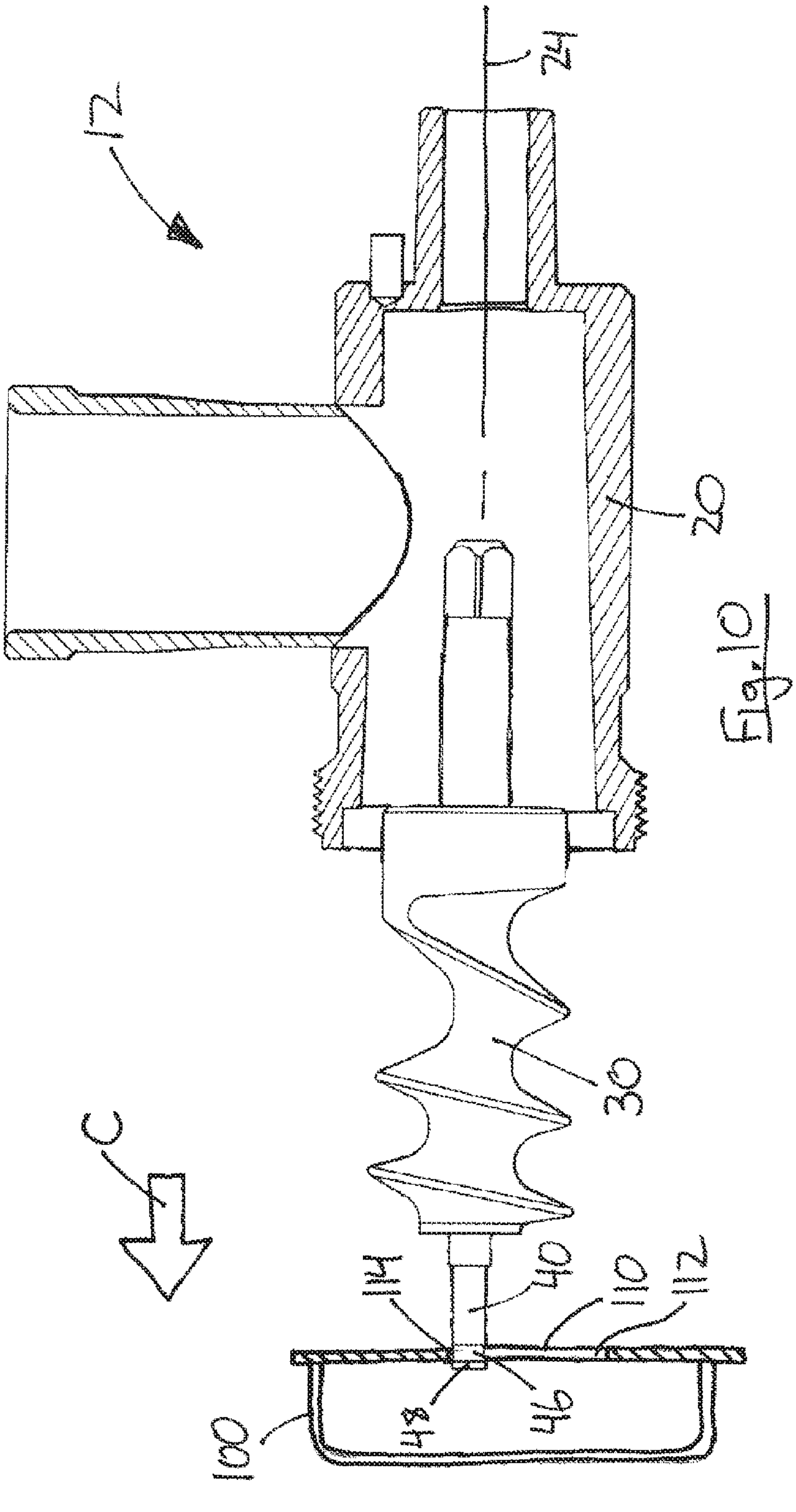

Referring to FIG. 10, with the auger removal tool 100 positioned as shown in FIGS. 9 and 9A, the tool is pulled or otherwise urged in the direction indicated generally by the arrow labeled C in FIG. 10. The interference between the plate 102/aperture 100 and the end portion 118 of the front shaft 40 prevents the tool from corning off the front shaft 40. As a result, the force applied to the tool 100 is transferred to the auger 30, which is removed from the housing 20 as shown.

While aspects of the present invention have been particularly shown and described with reference to the preferred embodiment above, it will be understood by those of ordinary skill in the art that various additional embodiments may be contemplated without departing from the spirit and scope of the present invention. For example, while the auger engaging component of the tool can have a configuration different than the illustrated aperture that extends through the plate. For instance, the auger engaging component could be a recess that is milled or otherwise machined in the base to have a configuration that is similar or identical to the illustrated tapered configuration. Other aspects, objects, and advantages of the present invention can be obtained, from a study of the drawings, the disclosure, and the appended claims.

Having described the invention, we claim:

1. A meat grinder system comprising:

a grinder head comprising a housing and an auger disposed in the housing for rotation about an axis, the auger including a shaft including a tool engaging portion;

a tool for facilitating removal of the auger from the housing, the tool comprising an auger engaging portion adapted to be received in the tool engaging portion of the shaft to form an interference that permits a removal force applied to the tool to be transferred to the auger;

wherein the tool comprises a plate having an auger receiving aperture, the auger receiving aperture having an elongated tapered configuration and defining the auger engaging portion along at least a portion of the periphery of the auger receiving aperture; and wherein the tool comprises a handle connected to the plate, the handle spanning lengthwise across the auger receiving aperture and being for manually manipulating the tool; and wherein the auger receiving aperture includes a large dimension first end portion, a small dimension second end portion, and opposing edges that extend from the first end portion to the second end portion, the edges having a tapered configuration in which the edges converge as they extend from the first end portion to the second end portion.

2. The system recited in claim 1, wherein the large dimension is sufficient to permit the shaft to pass freely through the auger receiving aperture, and the small dimension is configured such that the auger engaging portion forms the interference.

3. The system recited in claim 1, wherein the first and second end portions have rounded configurations, and the sidewalls extend tangentially from the first end portion to the second end portion.

4. The system recited in claim 1, wherein the tool engaging portion comprises an annular recess in the, the auger engaging portion of the tool being received in the recess to help form the interference.

* * * * *